United States Patent [19]

Tieman

[11] Patent Number: 5,426,837
[45] Date of Patent: Jun. 27, 1995

[54] METHOD OF ADJUSTING A PIEZO-ELECTRIC BENDING ELEMENT

[75] Inventor: Frans J. Tieman, Vosselaar, Belgium

[73] Assignee: F. J. Tieman B.V., Rockanje, Netherlands

[21] Appl. No.: 90,666

[22] Filed: Jul. 13, 1993

[30] Foreign Application Priority Data

Jul. 24, 1992 [NL] Netherlands ............... 9201338

[51] Int. Cl.⁶ .................. H01L 41/22; H01L 41/08
[52] U.S. Cl. .......................... 29/25.35; 29/593
[58] Field of Search ............... 29/25.35, 600, 601, 29/DIG. 3, 407, 593; 72/345; 310/312, 330, 331; 434/113, 114

[56] References Cited

U.S. PATENT DOCUMENTS

| | | | |
|---|---|---|---|
| 3,666,979 | 5/1972 | McElroy | 29/25.35 X |
| 3,724,739 | 4/1973 | Anderson et al. | 72/345 X |
| 3,833,999 | 9/1974 | Budyeh et al. | 29/407 |
| 3,913,195 | 10/1975 | Beaver | 29/25.35 |
| 4,004,166 | 1/1977 | Nakata | 29/25.35 X |
| 4,021,922 | 5/1977 | Goldberg | |
| 4,224,547 | 9/1980 | Miller | 310/312 |
| 4,283,178 | 8/1981 | Tetzlaff | 434/114 |
| 4,473,356 | 9/1984 | Fernando et al. | 434/114 |

FOREIGN PATENT DOCUMENTS 0237090 11/1989 European Pat. Off. .
122175 6/1985 Japan .

Primary Examiner—Peter Dungba Vo
Attorney, Agent, or Firm—Larson and Taylor

[57] ABSTRACT

The invention relates to a method of adjusting, in the course of applying predetermined voltages, an oblong piezo-electric bending element which at a first end has been supported by a part protruding in the longitudinal direction of the element, whereby this part is mechanically bent and consists of a material in which at least part of the bending deformation is permanent. In addition, the invention comprises a piezo-electric bending element as has been constructed by applying the method and tools for the application of the method.

14 Claims, 3 Drawing Sheets

METHOD OF ADJUSTING A PIEZO-ELECTRIC BENDING ELEMENT

BACKGROUND OF THE INVENTION

The invention relates to a method of adjusting, in the course of applying predetermined voltages, an oblong piezo-electric bending element which at a first end has been supported by a part protruding in the longitudinal direction of said element, as well as to a piezo-electric bending element as has been constructed by applying the method and also to tools for the application of the method.

A piezo-electric element and its adjustment has been described in the European patent specification 0237090, where a piezo-electric element has been adjusted by securing a fixed end, for instance by means of soldering, after its movable end has been brought in a specific place.

In many cases this method has proved to be sufficiently accurate and is considerably labour-saving, compared to an other possibility of adjustment as has been described in the U.S. Pat. No. 4,473,356, which amounts to this that a sensing pin is set lengthwise between the flexible member and the sensing surface of the braille cell.

The invention aims at providing a method which, after the flexible element has been secured, allows its adjustment, at which instance the method in accordance with the European patent specification 0237090 may or may not have been applied first. In broad outline it can be said that, as a result of the method known from the European patent specification, a good adjustment can be obtained, but that, for a very accurate adjustment and/or the correction of an adjustment that, for example, had been affected due to use, there is a need for a more finely operating process which can be applied to an element after it has completely been installed.

In applying such flexible bending elements for braille cells, it has been observed that the blind are very sensitive to small deviations in the position of the pins, particularly the so-called withdrawn position, and that even the smallest deviations have been found to be very annoying. This invention offers the possibility to adjust such braille cells, not only new cells prior to their delivery but also used ones, the adjustment of which has been worn out.

In order to put the above mentioned possibilities into practice, it is provided in accordance with the invention that the part is mechanically bent and consists of a material in which at least part of the bending deformation is permanent.

It may be observed that the movement of the piezo-electric element is generated due to the fact that this element bends under the influence of applied voltages. This bending relates to the entire element, with three conducting layers and, in between, two layers of piezo-electric material. See Patent Abstracts of Japan 30M 427, 60-122175 (A), or U.S. Pat. No. 4,283,178. In the invention, however, a permanent bending deformation is conveyed to a protruding part.

When applying the invention, the mechanical bending preferably occurs while observing, in relation to a reference point, that portion of the element that, in bending, moves while voltage is being applied.

The protruding part, which is bent when applying the invention, is preferably a conducting leaf of the element. It may be an extension of a central leaf, located between two piezo-electric bodies, or an extension of the outer layer, in which case it is possible that there is just one piezo-electric body present. In case of elements with a central leaf, both outer layers may be connected to each other and receive energizing voltages, which are higher and lower, respectively, than the voltage on the central leaf.

In this way a cumulative bending action of both piezoelectric bodies is obtained, but the direction of the electric vector in each of said bodies alternates, which may lead to depolarisation. The latter can be prevented by energizing both outer layers separately, in such way that in each of the piezo-electric bodies the voltage is always in the same direction, or there is no voltage at all.

It is possible to apply the method in accordance with the invention to an element which has already been adjusted by means of bending or securing one end, in which case in particular a high reliability can be obtained of, for example, a braille cell that has been fitted with the elements, by means of applying the method in accordance with the invention to an element which has undergone (been subjected to) an aging treatment. Experience has shown that in this way an accurately adjusted element can be obtained as well as an element that in practice no longer can become deranged.

The invention also comprises tools which facilitate the application of the method. A tool, which does not serve to bend a metal strip, but to hold a metal ring, simultaneously supporting it, is known from the patent document U.S. Pat. No. 4,021,922.

BRIEF DESCRIPTION OF THE DRAWINGS

The invention is further elucidated in the following by means of the drawing in which FIG. 1 schematically shows a side view of a braille cell to which the invention can be applied.

DETAILED DESCRIPTION OF THE DRAWINGS

Figure 1:
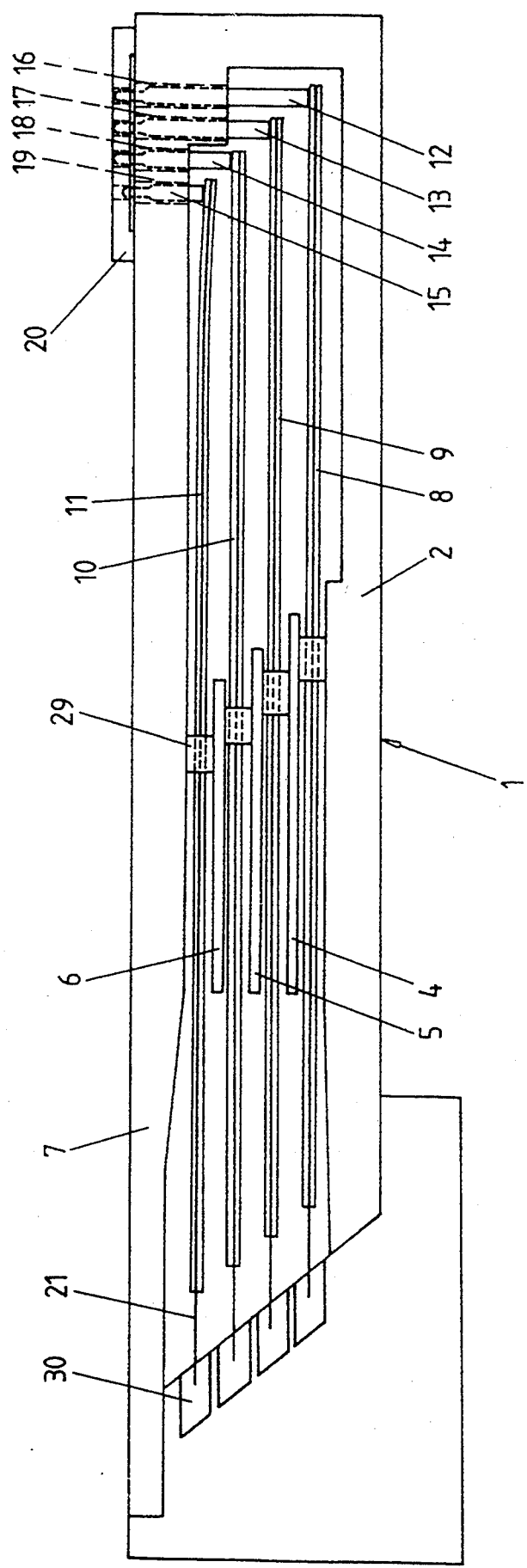

In FIG. 1 a side view is presented of a braille cell with a frame 1 with a lower beam 2 with supporting partitions 4,5 and 6, which are fastened to a central partition, and with an upper beam 7.

Each of the piezo-electric elements 8,9,10 and 11 consists of two piezo-electric layers and, between those, a leaf, protruding on the left side. These leaves are soldered or welded by their sides to a small surface 30 of each element. The protruding leaves, indicated by 21, are made of a material which is easy to be deformed permanently, such as copper, bronze, brass or soft steel. At their other ends the elements 8,9,10 and 11 work together with pins 12,13,14 and 15, which via holes 16,17,18 and 19 can pass through a sensing plate 20, and, when bending the right side ends of the piezo-electric bending elements 8,9,10 or 11, rise above the upper surface of the sensing plate 20.

As is to be seen in FIG. 1, the right side of the piezo-electric element 11 is positioned somewhat diagonally lower and, as a result, the pin 15 is at its upper side further removed from the surface of the sensing plate 20 than the other pins.

The invention aims to rectify this incorrect position.

Figure 2:
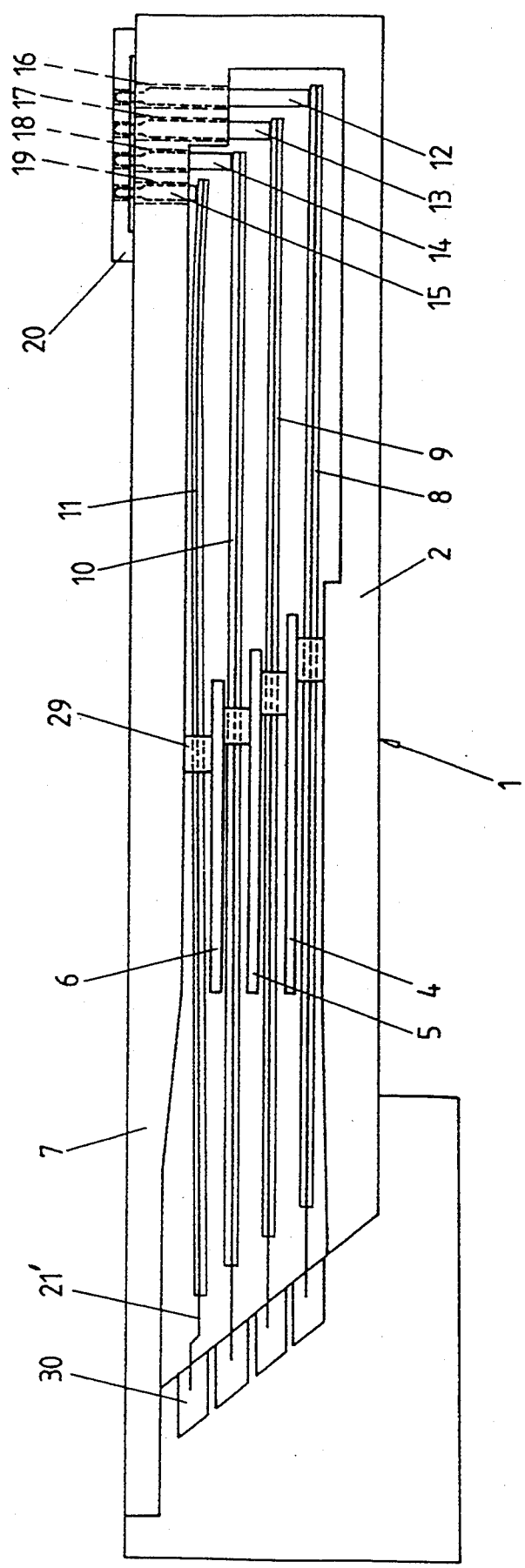
FIG. 2 presents in an exaggerated manner the alterations which occur when applying the invention.

How this is realised, is shown in FIG. 2. The leaf 21' of the upper piezo-electric element has been bent in such manner that the left side end of this element has been moved slightly downwards, as a result of which the right side end of this element is moved upwards, via the clamp 29, until it brings the pin 15 into a position that corresponds with those of the pins 11, 12, 13 and 14.

Of course, the protruding parts 21 of the leaves have to be secured before the invention can effectively be applied. It is also possible, however, to apply the invention outside the actual braille cell, by placing a piezo-electric element in a mould, or the such, suitable for this purpose, and carrying out the bending process, in such manner that the element has exactly the desired shape when it is introduced into the braille cell.

It will be obvious that the fastening of the leaf 21 to the small surfaces 30 need not necessarily occur by means of soldering or welding, but that also other methods of fastening can be used, for instance by applying glue. Of course, in almost all applications of such an element the leaf acts as an electric connecting terminal for the piezoelectric element and care should be taken that this leaf is connectable.

In the drawn example of the application, the piezo-electric elements are supported approximately in the middle by a supporting clamp, which is somewhat concave at the sides facing the elements. This way a good combination is obtained of a sufficiently wide adjustment range and a sufficiently great force exercised on the pin concerned. It is, however, not at all necessary that such elements are located near the middle of the piezo-electric elements, and in case of sufficiently rigid leaves 21 such supporting parts may entirely be dispensed with.

Figure 3:
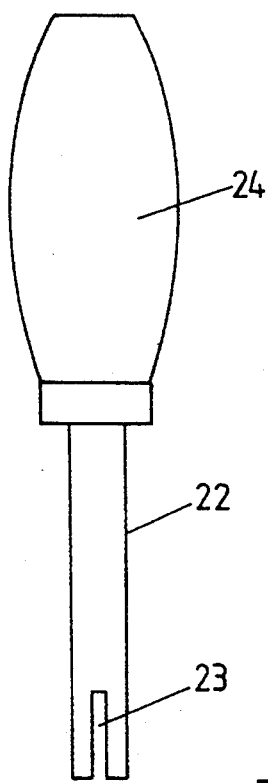
FIG. 3 shows a first example of a tool for the application of the invention.

In FIG. 3 a small tool has been presented for applying the invention. It consists of a shaft 22 with, at its lower side, a slot 23 and a handle 24. Of course, the shaft 22 can also be connected to a holding arm that is perpendicular to the shaft.

Figure 4:
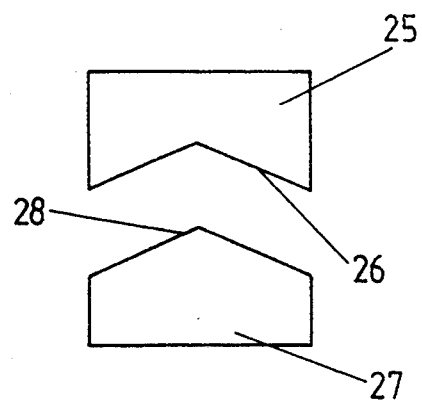
FIG. 4 shows another tool.

FIG. 4 shows a cross-sectional view of the jaws of a pair of tongs. One jaw 25 has an indentation 26 and the other jaw 27 a rib 28 which, together with the indentation 26, is capable of bending the protruding parts 21. A pair of tongs of the type as has been presented in FIG. 4 is preferably constructed in such manner that the jaws 25 and 27 move practically parallel towards and from each other, in order to bend a leaf 21 evenly across its entire width.

When applying the invention, it is possible to obtain a wider adjustment range by allowing the protruding parts 21 of the leaves a longer free end portion, as a result of which a wider bending is also possible. During the bending action, in the FIGS. 1 and 2 an alteration of position will generally occur not only vertically, but there will also be a very small alteration in longitudinal direction. However, there is no objection to this, also because the supports 29 allow a longitudinal shift. Even if a support had been put in there by means of an adhesive joint of somewhat flexible glue, it would not matter.

Although the method in accordance with the invention has been elucidated with reference to piezo-electric elements which have been placed in a braille cell, it will be clear that also in the case of other applications of such bending elements the invention can be applied.

The applied predetermined voltages constitute one of the voltage combinations connected to a predetermined position, for instance one of the two positions the element takes when put into operation.

I claim:

1. A method of adjusting a movable end of a longitudinal piezo-electric bending element relative to a longitudinal frame comprising the steps of:

forming a part of the piezo-electric bending element, which part connects in a longitudinal direction a mounting end of the piezo-electric bending element with a remainder of the piezo-electric bending element including the movable end, of a material which is capable of permanent bending deformation;

mounting the mounting end to the frame such that the movable end is selectively movable laterally from a first position to a second position by applying a predetermined voltage to the piezo-electric bending element; and mechanically bending the part permanently with the mounting end secured in place before or after the mounting step so that a location of at least the first position of the movable end relative to the frame is offset laterally to a desired location from a location which would have been obtained if the bending step were not performed.

2. A method of adjusting a movable end as claimed in claim 1 wherein the bending step includes the bending of the part until a specified portion of the piezo-electric bending element is located at a predetermined position.

3. A method of adjusting a movable end as claimed in claim 1 wherein the piezo-electric bending element includes a conducting leaf, and wherein said forming step includes the extending of the conducting leaf from the remainder of the piezo-electric bending element to form the part.

4. A method of adjusting a movable end as claimed in claim 1 wherein said mounting step is performed prior to said bending step; said mounting step includes the securing of the mounting end in place such that a portion of the piezo-electric bending element is initially located close to a predetermined position when the piezo-electric bending element has the predetermined voltage applied thereto; and said bending step bends the part so that the piezo-electric bending element is then located exactly at the predetermined position.

5. A method of adjusting a movable end as claimed in claim 1 and further including the steps of subjecting the piezo-electric bending element to an aging treatment wherein the piezo-electric bending element has applied thereto the predetermined voltage a great number of times whereby the location of the first position of the movable end relative to the frame is offset laterally from the desired position, and mechanically bending the part after the subjecting step a second time so that the movable end is returned to the desired location when in the first position.

6. A method of adjusting a movable end as claimed in claim 5 wherein said aging step is performed under predetermined temperature and humidity conditions.

7. A method of adjusting a movable end as claimed in claim 1 and further including the step of supporting of the piezo-electric bending element at a position between the bend of the part and the movable end.

8. A method of adjusting a movable end of a longitudinal piezo-electric bending element relative to a sensing plate of a braille cell comprising the steps of:

forming a part of the piezo-electric bending element, which part connects in a longitudinal direction a mounting end of the piezo-electric bending element with a remainder of the piezo-electric bending element including the movable end, of a material which is capable of permanent bending deformation;

mounting the mounting end to the braille cell such that the movable end is selectively movable laterally from a first position to a second position by applying a predetermined voltage to the piezo-electric bending element so that a pin which is mounted in an associated hole in the sensing plate is similarly moved by movement of the movable end; and mechanically bending the part permanently with the mounting end secured in place before or after the mounting step so that a location of at least the first position of the movable end relative to the sensing plate is offset laterally to a desired location where the associated pin is at a desired location from a location which would have been obtained if the bending step were not performed where the associated pin would have been withdrawn into the sensing plate from the desired position thereof.

9. A method of adjusting a movable end as claimed in claim 8 wherein the bending step includes the bending of the part until a specified portion of the piezo-electric bending element is located at a predetermined position.

10. A method of adjusting a movable end as claimed in claim 8 wherein the piezo-electric bending element includes a conducting leaf, and wherein said forming step includes the extending of the conducting leaf from the remainder of the piezo-electric bending element to form the part.

11. A method of adjusting a movable end as claimed in claim 8 wherein said mounting step is performed prior to said bending step; said mounting step includes the securing of the mounting end in place in the braille cell such that a portion of the piezo-electric bending element is initially located close to a predetermined position when the piezo-electric bending element has the predetermined voltage applied thereto; and said bending step bends the part so that the piezo-electric bending element is then located exactly at the predetermined position.

12. A method of adjusting a movable end as claimed in claim 8 and further including the steps of subjecting the piezo-electric bending element to an aging treatment wherein the piezo-electric bending element has applied thereto the predetermined voltage a great number of times whereby the location of the first position of the movable end relative to the frame is offset laterally from the desired position, and mechanically bending the part after the subjecting step a second time so that the movable end is returned to the desired location when in the first position.

13. A method of adjusting a movable end as claimed in claim 12 wherein said aging step is performed under predetermined temperature and humidity conditions.

14. A method of adjusting a movable end as claimed in claim 8 and further including the step of supporting of the piezo-electric bending element in the braille cell at a position between the bend of the part and the movable end.

* * * * *